US 11,580,696 B2

(12) United States Patent
Sasaki

(10) Patent No.: US 11,580,696 B2
(45) Date of Patent: Feb. 14, 2023

(54) SURVEYING DATA PROCESSING DEVICE, SURVEYING DATA PROCESSING METHOD, AND SURVEYING DATA PROCESSING PROGRAM

(71) Applicant: Topcon Corporation, Tokyo (JP)

(72) Inventor: You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 205 days.

(21) Appl. No.: 16/986,312

(22) Filed: Aug. 6, 2020

(65) Prior Publication Data

US 2021/0065446 A1 Mar. 4, 2021

(30) Foreign Application Priority Data

Aug. 26, 2019 (JP) .............................. JP2019-153506

(51) Int. Cl.
*G06T 17/10* (2006.01)
*G06T 7/521* (2017.01)
(Continued)

(52) U.S. Cl.
CPC .............. *G06T 17/10* (2013.01); *G06T 7/344* (2017.01); *G06T 7/521* (2017.01); *G06T 7/536* (2017.01); *G06T 2207/10028* (2013.01)

(58) Field of Classification Search
CPC ........... G06T 17/00; G06T 2207/10028; G06T 19/20; G06T 17/20; G06T 17/05;
(Continued)

(56) References Cited

U.S. PATENT DOCUMENTS 7,969,558 B2 6/2011 Hall
8,045,762 B2 10/2011 Otani et al.
(Continued)

FOREIGN PATENT DOCUMENTS

JP 2008-268004 A 11/2008
JP 2010-151682 A 7/2010
(Continued)

OTHER PUBLICATIONS

Extended European Search Report dated Feb. 12, 2021, in connection with European Patent Application No. 20186956.7, 7 pgs.
(Continued)

*Primary Examiner* — Xiao M Wu
*Assistant Examiner* — Scott E Sonners
(74) *Attorney, Agent, or Firm* — Chiesa, Shahinian & Giantomasi PC

(57) ABSTRACT

A surveying data processing device includes a point cloud data acquiring unit, a three-dimensional model acquiring unit, a first correspondence relationship determining unit, an extended three-dimensional data generating unit, and a second correspondence relationship determining unit. The point cloud data acquiring unit acquires first point cloud data obtained by laser scanning, at a first viewpoint, and acquires second point cloud data obtained by laser scanning, at a second viewpoint. The three-dimensional model acquiring unit acquires data of a three-dimensional model. The first correspondence relationship determining unit obtains a correspondence relationship between the first point cloud data and the three-dimensional model. The extended three-dimensional data generating unit generates extended three-dimensional data in which the first point cloud data is extended, on the basis of the correspondence relationship. The second correspondence relationship determining unit determines a correspondence relationship between the
(Continued)

extended three-dimensional data and the second point cloud data.

9 Claims, 6 Drawing Sheets

(51) Int. Cl.
    *G06T 7/33*     (2017.01)
    *G06T 7/536*     (2017.01)

(58) Field of Classification Search
    CPC ............... G06T 19/006; G06T 2200/08; G06T 2219/2021; G06T 15/205; G06T 2200/04
    See application file for complete search history.

(56) References Cited

U.S. PATENT DOCUMENTS

| | | |
|---|---|---|
| 8,767,190 B2 | 7/2014 | Hall |
| 9,207,069 B2 | 12/2015 | Kitamura et al. |
| 2009/0241358 A1 | 10/2009 | Ohtomo et al. |
| 2010/0256940 A1 | 10/2010 | Ogawa et al. |
| 2012/0256916 A1 | 10/2012 | Kitamura et al. |
| 2013/0176305 A1 | 7/2013 | Ito et al. |
| 2013/0236107 A1 | 9/2013 | Fukaya et al. |
| 2014/0037194 A1 | 2/2014 | Kitamura et al. |
| 2014/0043436 A1* | 2/2014 | Bell ..................... H04N 13/204 348/46 |
| 2014/0278065 A1* | 9/2014 | Ren ..................... G06T 17/05 701/454 |
| 2014/0314308 A2 | 10/2014 | Kitamura et al. |
| 2015/0206023 A1 | 7/2015 | Kochi et al. |
| 2015/0293224 A1 | 10/2015 | Eldada et al. |
| 2016/0063716 A1* | 3/2016 | Schroeter ............... G06T 15/08 382/154 |
| 2017/0004345 A1 | 1/2017 | Sasaki et al. |
| 2017/0220887 A1* | 8/2017 | Fathi ..................... G06V 20/10 |
| 2017/0269197 A1 | 9/2017 | Hall et al. |
| 2018/0089899 A1* | 3/2018 | Piemonte ............ G01C 21/365 |

FOREIGN PATENT DOCUMENTS

| | | |
|---|---|---|
| JP | 5057734 B2 | 10/2012 |
| JP | 2012-230594 A | 11/2012 |
| JP | 2013-178656 A | 9/2013 |
| JP | 2013-186816 A | 9/2013 |
| JP | 2014-035702 A | 2/2014 |
| JP | 2015-046128 A | 3/2015 |
| JP | 2017-015598 A | 1/2017 |
| WO | 2011070927 A1 | 6/2011 |
| WO | 2012141235 A1 | 10/2012 |

OTHER PUBLICATIONS

Cheng et al., "Registration of Laser Scanning Point Clouds: A Review," 2018, Sensors, vol. 18, No. 5, 25 pgs., XP055489879.

* cited by examiner

SURVEYING DATA PROCESSING DEVICE, SURVEYING DATA PROCESSING METHOD, AND SURVEYING DATA PROCESSING PROGRAM

CROSS-REFERENCE TO RELATED APPLICATIONS

This application claims the benefit of priority from Japanese Patent Application No. 2019-153506, filed Aug. 26, 2019, the disclosure of which is incorporated herein in its entirety.

BACKGROUND

The present invention relates to a technique for laser scanning.

Techniques of obtaining point cloud data by laser scanning are publicly known. In these techniques, three-dimensional coordinates of large numbers of points are obtained by laser scanning, and the scanned object is recognized by an aggregation of the points from which the three-dimensional coordinates are obtained. This aggregation of points, from which the three-dimensional coordinates are obtained, is point cloud data.

In laser scanning, there may be parts that are not irradiated by scanning laser light. In this case, laser scanning is performed again, on an area that was not scanned at the previous time, by changing the instrument point or the viewpoint. Japanese Patent No. 5057734 discloses a technique for again performing laser scanning for a part that was not scanned.

In one example, it is assumed that two sets of point cloud data are obtained by performing laser scanning at two instrument points at locations different from each other. This case requires an operation for determining a correspondence relationship between the two sets of point cloud data. This operation is also called "position matching" or "registration" of point cloud data. Determination of the correspondence relationship between the two sets of point cloud data enables describing the two sets of point cloud data in the same coordinate system, thereby integrating the two sets of point cloud data.

The operation for determining the correspondence relationship between two sets of point cloud data involves an operation of searching for parts commonly contained in the two sets of point cloud data and making these parts coincide with each other. The greater the amount of common parts that exist, the more easily and accurately the operation for determining the correspondence relationship is performed.

SUMMARY

In view of these circumstances, an object of the present invention is to provide a technique that enables easier and more accurate operation for determining a correspondence relationship between multiple point cloud data obtained at different viewpoints.

The present invention provides a surveying data processing device including a point cloud data acquiring unit, a three-dimensional model acquiring unit, a first correspondence relationship determining unit, an extended data generating unit, and a second correspondence relationship determining unit. The point cloud data acquiring unit acquires first point cloud data and second point cloud data. The first point cloud data is obtained by laser scanning, from a first viewpoint, an object to be measured. The second point cloud data is obtained by laser scanning, from a second viewpoint, the object to be measured. The three-dimensional model acquiring unit acquires data of a three-dimensional model of the object to be measured. This data is prepared in advance. The first correspondence relationship determining unit obtains a correspondence relationship between the first point cloud data and at least a part of the three-dimensional model. The extended data generating unit integrates information of the at least a part of the three-dimensional model with the first point cloud data to generate extended data in which the first point cloud data is extended, on the basis of the correspondence relationship between the first point cloud data and the at least a part of the three-dimensional model. The second correspondence relationship determining unit determines a correspondence relationship between the extended data and the second point cloud data.

According to aspects of the present invention, the three-dimensional model may be acquired from design data of the object to be measured. According to aspects of the present invention, the three-dimensional model may contain an occluded part of the object to be measured that is hidden and is thus not visible from the first viewpoint but is visible from the second viewpoint. According to aspects of the present invention, the determination of the correspondence relationship between the extended data and the second point cloud data may include determination of a correspondence relationship between the occluded part and the second point cloud data.

According to aspects of the present invention, the three-dimensional model may contain a specific part of the object to be measured that is out of a range of emission of the laser scanning at the first viewpoint, but is in a range of emission of the laser scanning at the second viewpoint. According to aspects of the present invention, the determination of the correspondence relationship between the extended data and the second point cloud data may include determination of a correspondence relationship between the specific part and the second point cloud data. According to aspects of the present invention, in determining the correspondence relationship between the first point cloud data and the three-dimensional model, a condition in which a statistical value of a separated distance between a point constituting the first point cloud data and a plane constituting the three-dimensional model satisfies a specific condition, may be searched for.

The present invention can also be understood to be a surveying data processing method. The surveying data processing method includes acquiring first point cloud data and second point cloud data. The first point cloud data is obtained by laser scanning, from a first viewpoint, an object to be measured. The second point cloud data is obtained by laser scanning, from a second viewpoint, the object to be measured. The surveying data processing method also includes acquiring data of a three-dimensional model of the object to be measured. This data is prepared in advance. The surveying data processing method also includes obtaining a correspondence relationship between the first point cloud data and at least a part of the three-dimensional model, integrating information of the at least a part of the three-dimensional model with the first point cloud data to generate extended data in which the first point cloud data is extended, on the basis of the correspondence relationship between the first point cloud data and the at least a part of the three-dimensional model, and determining a correspondence relationship between the extended data and the second point cloud data.

The present invention can also be understood to be a non-transitory computer recording medium storing computer executable instructions that, when executed by a computer processor, cause the computer processor to acquire first point cloud data and second point cloud data. The first point cloud data is obtained by performing laser scanning, from a first viewpoint, on an object to be measured. The second point cloud data is obtained by performing laser scanning, from a second viewpoint, on the object to be measured. The computer executable instructions that, when executed by a computer processor, also cause the computer processor to acquire data of a three-dimensional model of the object to be measured. This data is prepared in advance. The computer executable instructions that, when executed by a computer processor, also cause the computer processor to obtain a correspondence relationship between the first point cloud data and at least a part of the three-dimensional model, integrate information of the at least a part of the three-dimensional model with the first point cloud data to generate extended data in which the first point cloud data is extended, on the basis of the correspondence relationship between the first point cloud data and the at least a part of the three-dimensional model, and determine a correspondence relationship between the extended data and the second point cloud data.

The present invention provides a technique that enables easier and more accurate operation for determining a correspondence relationship between multiple point cloud data obtained at different viewpoints.

DETAILED DESCRIPTION

1. First Embodiment (Overview)

Figure 1:
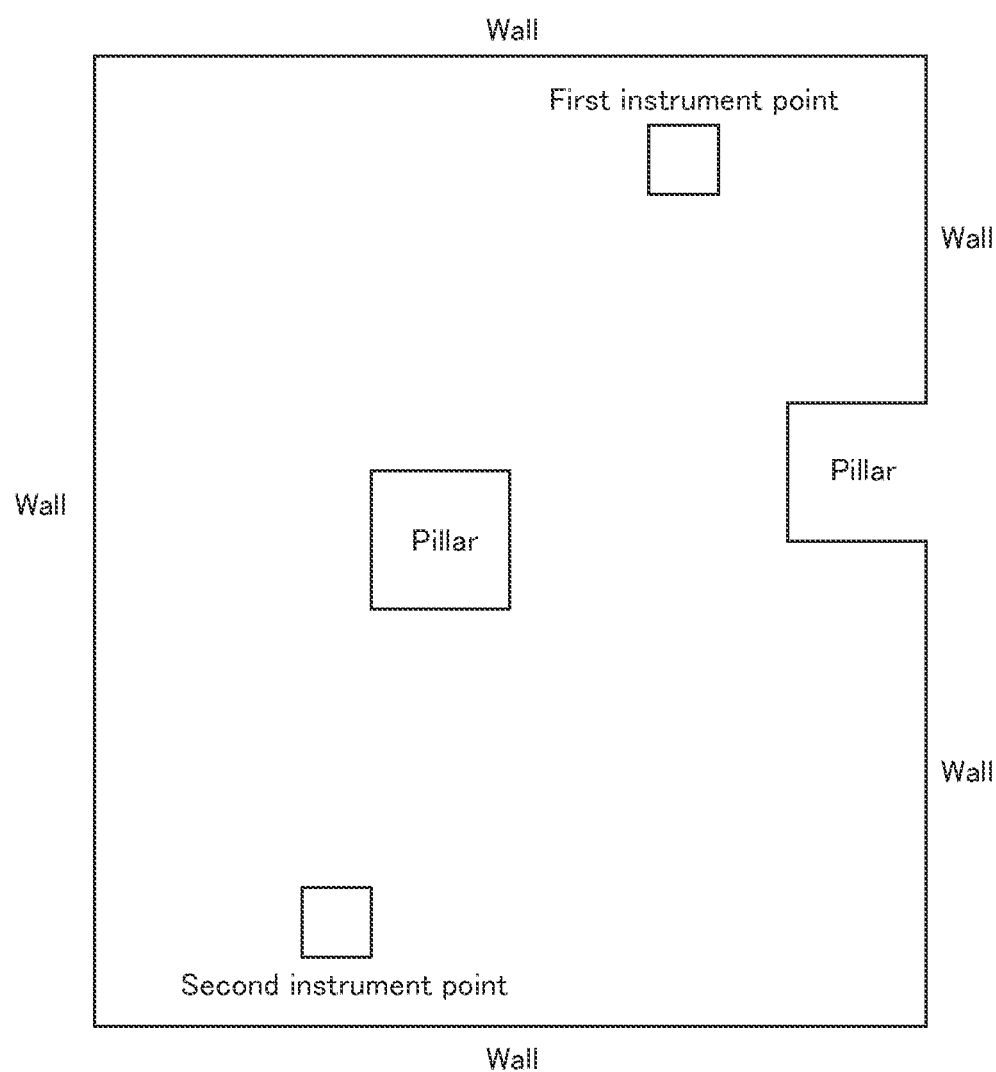
FIG. 1 is a conceptual diagram of a room to be subjected to laser scanning, as viewed from above.

FIG. 1 shows a conceptual diagram of a room to be measured, as viewed from above. In this example, point cloud data of an interior shape of a room, such as of a wall, a ceiling, a floor, a pillar, or a beam in the room is obtained by performing laser scanning of the room. The target to be subjected to laser scanning is not limited to an interior of a room and may be, e.g., each type of a building, a structure, or a construction site.

FIG. 1 shows a room as viewed from above in a vertical direction. FIG. 1 shows a section cut along a horizontal plane of walls, as viewed from above in the vertical direction. Note that FIG. 1 is a conceptual diagram showing walls without considering the thicknesses.

Figure 2A:
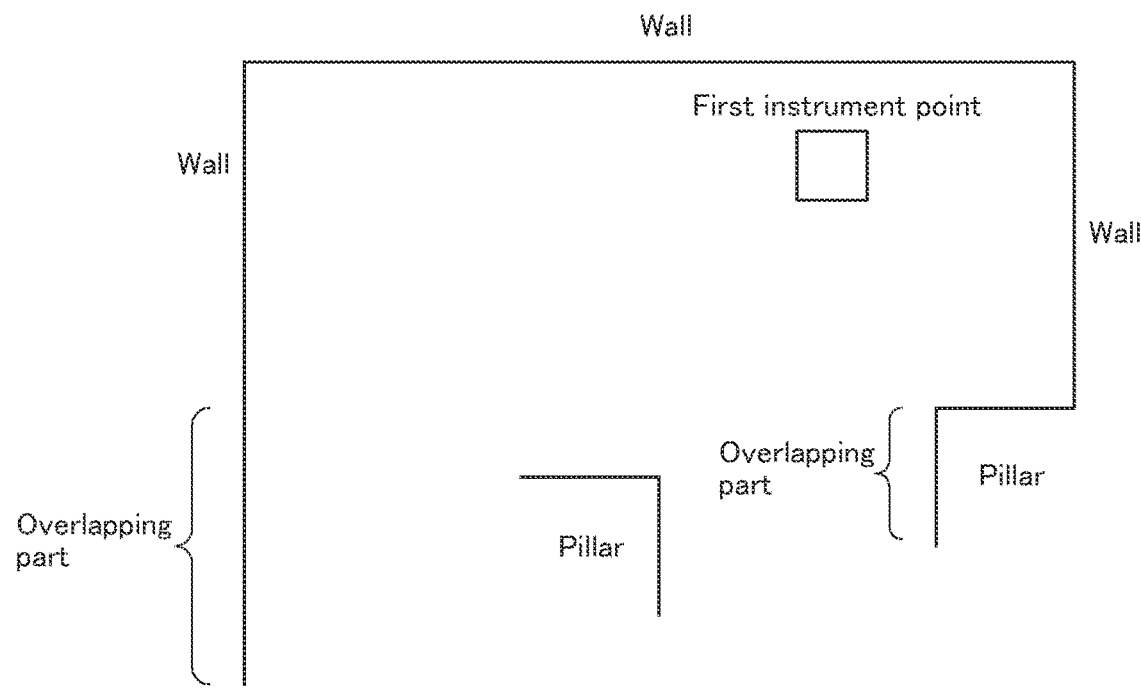
FIG. 2A is a conceptual diagram showing first point cloud data.

FIG. 2A shows first point cloud data that is obtained by laser scanning using a laser scanner set up at a first instrument point in FIG. 1. The position of the viewpoint and the position of the cut section in FIG. 2A are the same as in FIG. 1.

Figure 2B:
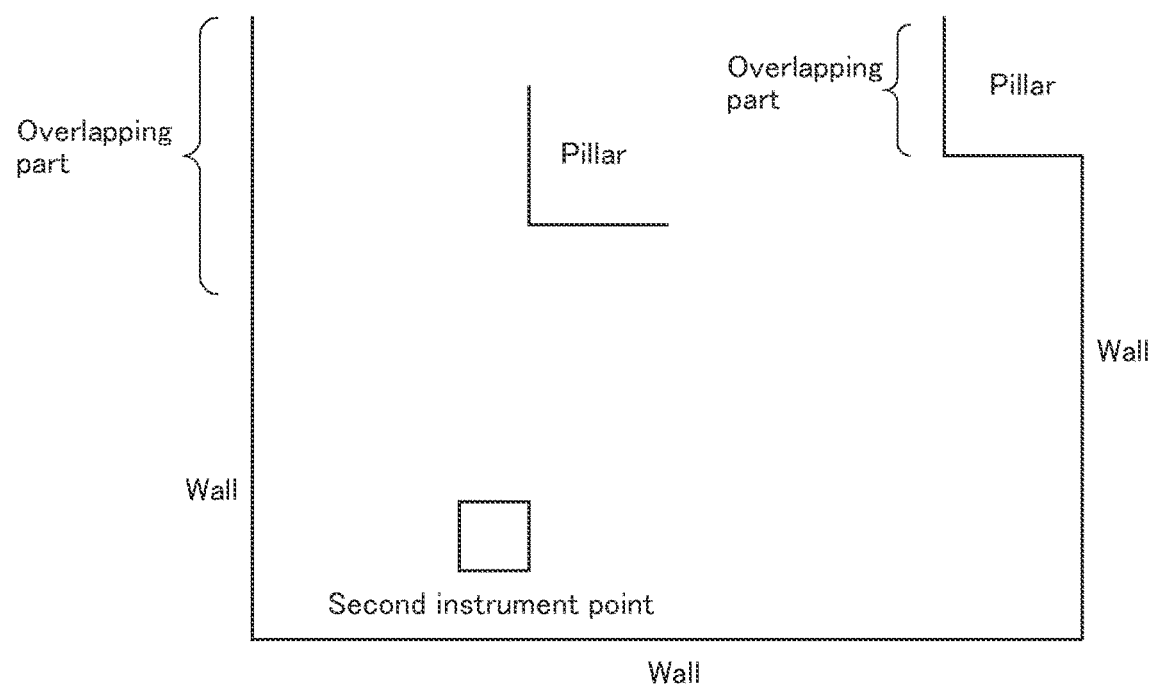
FIG. 2B is a conceptual diagram showing second point cloud data.

FIG. 2B shows second point cloud data that is obtained by laser scanning using the laser scanner set up at a second instrument point. The position of the viewpoint and the position of the cut section in FIG. 2B are the same as in FIG. 1. The laser scanner set up at the first instrument point and the laser scanner set up at the second instrument point may be individually prepared.

Herein, the instrument point is a point at which the laser scanner is set up, and it serves as an optical origin of laser scanning. Although FIGS. 2A and 2B illustrate point clouds in the horizontal plane corresponding to FIG. 1, actual point clouds are spread in a three-dimensional space.

The locations of the first and the second instrument points in the absolute coordinate system are unknown at the time of performing laser scanning. The absolute coordinate system is a coordinate system for describing GNSS data or map data. The location in the absolute coordinate system is described in terms of, for example, latitude, longitude, and elevation. The location in the absolute coordinate system of each instrument point may be obtained and be used as known data.

The first point cloud data, which is obtained by laser scanning at the first instrument point, and the second point cloud data, which is obtained by laser scanning at the second instrument point, contain pieces of data that partially overlap as well as pieces of data that do not overlap. For example, in a case of focusing on a pillar at the center, a surface on the side of the first instrument point is contained in the first point cloud data in FIG. 2A, and a surface on the side of the second instrument point is contained in the second point cloud data in FIG. 2B. In addition, the two sets of point cloud data do not overlap at the pillar. This is because the first and the second instrument points are selected in such a manner as to have this pillar therebetween.

The following describes a method for determining a correspondence relationship between the first point cloud data in FIG. 2A and the second point cloud data in FIG. 2B, that is, a method of matching therebetween. First, a typical method using a conventional technique will be described. This method involves searching for parts commonly contained in both the first and the second point cloud data and determining a correspondence relationship between the first and the second point cloud data by referring to these common parts.

In this typical method, the more common parts that exist, the greater the efficiency of the determination of a correspondence relationship. However, in a case in which there are few common parts, the determination of a correspondence relationship becomes difficult, and a load of the calculations, as well as a tendency to mistakenly find a correspondence relationship, increases.

In view of this, the technique used in the present invention involves generating extended three-dimensional data in which three-dimensional information of the first point cloud data is extended by using a three-dimensional model of the measured object that is obtained by another method in order to increase parts commonly contained in both the first and the second point cloud data. A correspondence relationship between this extended three-dimensional data and the second point cloud data is then determined.

The extended three-dimensional data contains a part that is hidden from the first instrument point due to occlusion, but can be viewed from the second instrument point or can be subjected to laser scanning. The extended three-dimensional data also contains a part that is out of the emission range of laser scanning at the first instrument point, but is in the emission range of laser scanning at the second instrument point.

These parts are also contained in the second point cloud data, which is obtained at the second instrument point. Thus, the extended three-dimensional data and the second point cloud data contain more common parts than in a conventional method, and determination of the correspondence relationship is performed with greater efficiency and greater accuracy.

Figure 3:
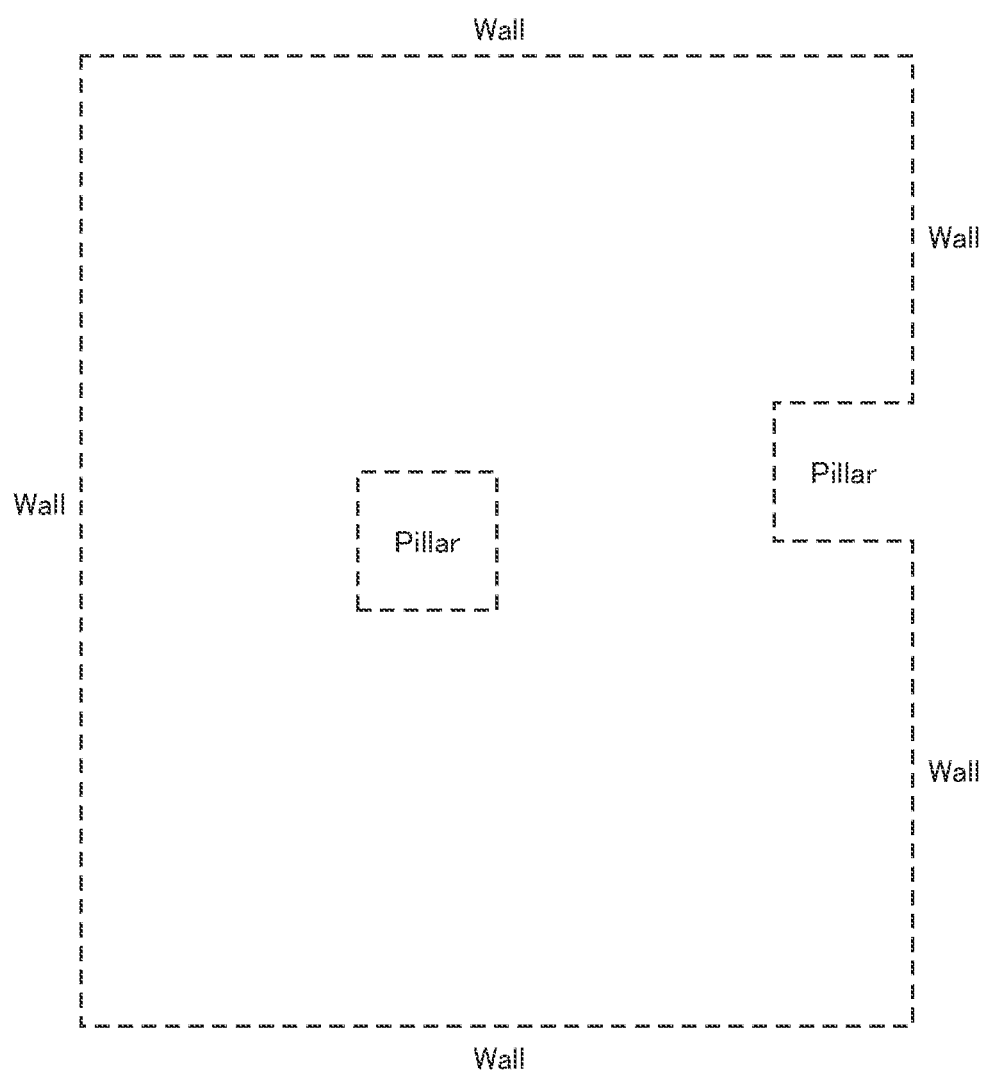
FIG. 3 is a three-dimensional model diagram of the room to be subjected to laser scanning.

FIG. 3 is a plane view of a three-dimensional model of the room to be measured herein, as viewed from above. This three-dimensional model is acquired from design data, e.g., CAD data for design. FIG. 3 shows parts corresponding to those in FIGS. 1, 2A, and 2B.

Figure 4A:
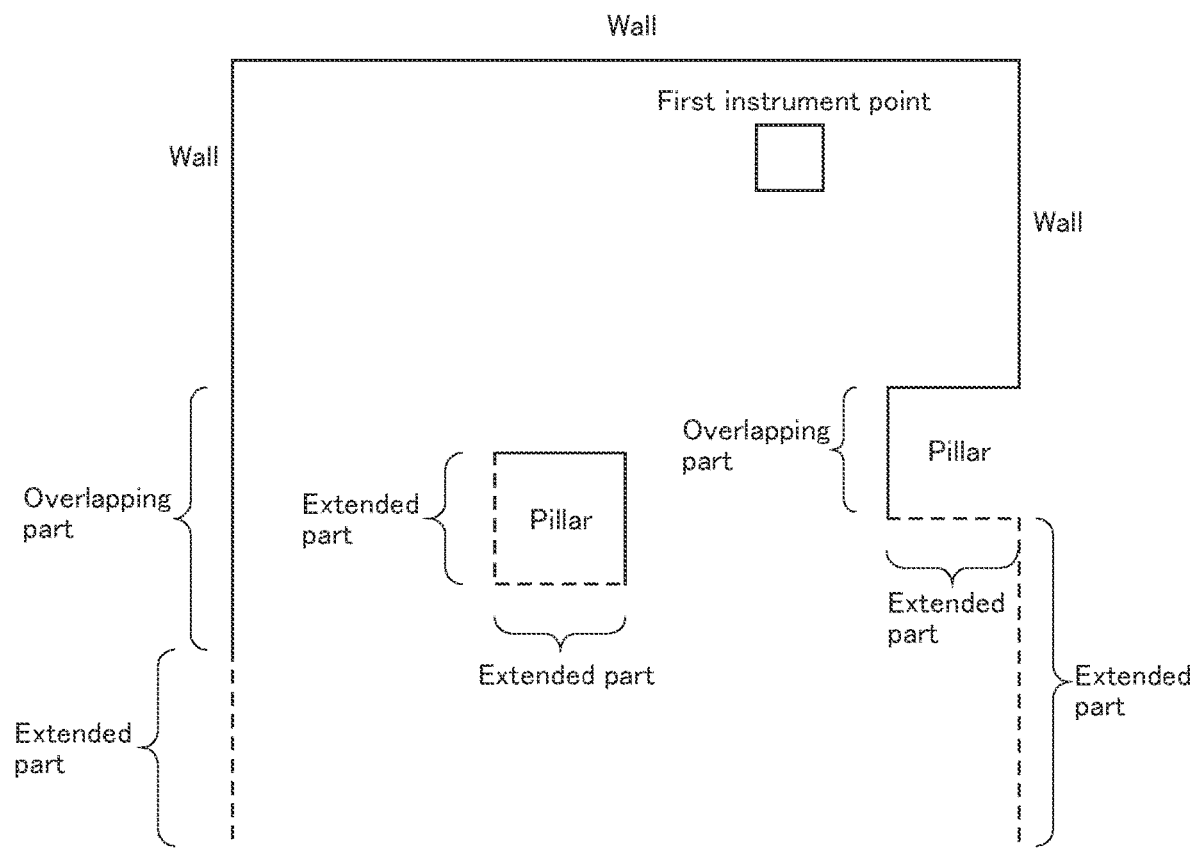
FIG. 4A is a conceptual diagram showing an example of an extended three-dimensional model.
Figure 4B:
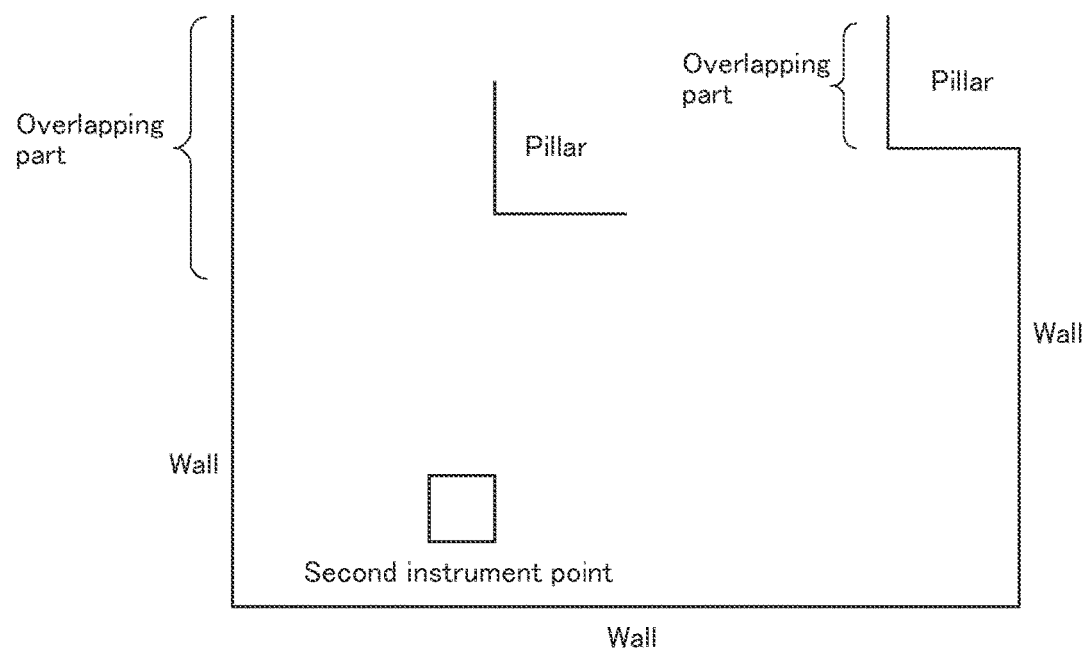
FIG. 4B is a conceptual diagram showing second point cloud data.

FIG. 4A shows an example of extended three-dimensional data. The extended three-dimensional data shown in FIG. 4A is obtained by merging the first point cloud data shown in FIG. 2A and the design data-based three-dimensional model shown in FIG. 3. In the extended three-dimensional data shown in FIG. 4A, three-dimensional data of parts that are occluded from the first instrument point are added to the first point cloud data to extend the three-dimensional information of the first point cloud data. FIG. 4B shows the same figure as that of the second point cloud data in FIG. 2B.

The extended parts in FIG. 4A are not obtained by laser scanning at the first instrument point, but are instead obtained by laser scanning at the second instrument point, and are therefore contained also in the second point cloud data. Thus, a correspondence relationship between the extended three-dimensional data in FIG. 4A and the second point cloud data in FIG. 4B is determined by using the extended parts in addition to the parts commonly contained in both of the first and the second point cloud data. This method uses three-dimensional data in an amount greater than in a conventional case of using only common parts, in determining the correspondence relationship. This further facilitates determination of the correspondence relationship between the extended three-dimensional data in FIG. 4A and the second point cloud data in FIG. 4B and increases accuracy of the determination of the correspondence relationship.

As a result of determination of the correspondence relationship between the extended three-dimensional data in FIG. 4A and the second point cloud data in FIG. 4B, the correspondence relationship between the first point cloud data contained in the extended three-dimensional data, and the second point cloud data, is determined. Although descriptions are omitted, correspondence relationships of point cloud data relating to a floor surface and a ceiling surface are also determined in a similar manner.

In the condition in which the correspondence relationship between the first and the second point cloud data is determined, the first and the second point cloud data can be integrated, that is, the first and the second point cloud data can be described in the same coordinate system.

The data of the three-dimensional model of the measured object, in this example, the design data-based three-dimensional model, contained in the extended three-dimensional data, may be eliminated after the correspondence relationship between the first and the second point cloud data is determined. Of course, at least a part of this three-dimensional model may be caused to remain.

In addition to extend the first point cloud data, the second point cloud data may be extended. In this case, a correspondence relationship between first extended three-dimensional data based on the first point cloud data and second extended three-dimensional data based on the second point cloud data, is determined.

The second extended three-dimensional data based on the second point cloud data directly or indirectly contains the second point cloud data. Thus, as a result of the determination of the correspondence relationship between the first extended three-dimensional data and the second extended three-dimensional data, the correspondence relationship between the first extended three-dimensional data and the second point cloud data is determined.

The number of sets of point cloud data in which a correspondence relationship is to be determined is not limited to two. For example, the present invention can also be used in a process of determining correspondence relationships between three or more sets of point cloud data.

Although an example of using a design data-based three-dimensional model as three-dimensional data for extension is described herein, data of laser scanning that is performed in the past can also be used as three-dimensional data for extending first point cloud data. Moreover, point cloud data that is generated by a principle of stereoscopic photogrammetry or three-dimensional data based on this point cloud data can also be used as three-dimensional data for the extension.

Block Diagram

Figure 5:
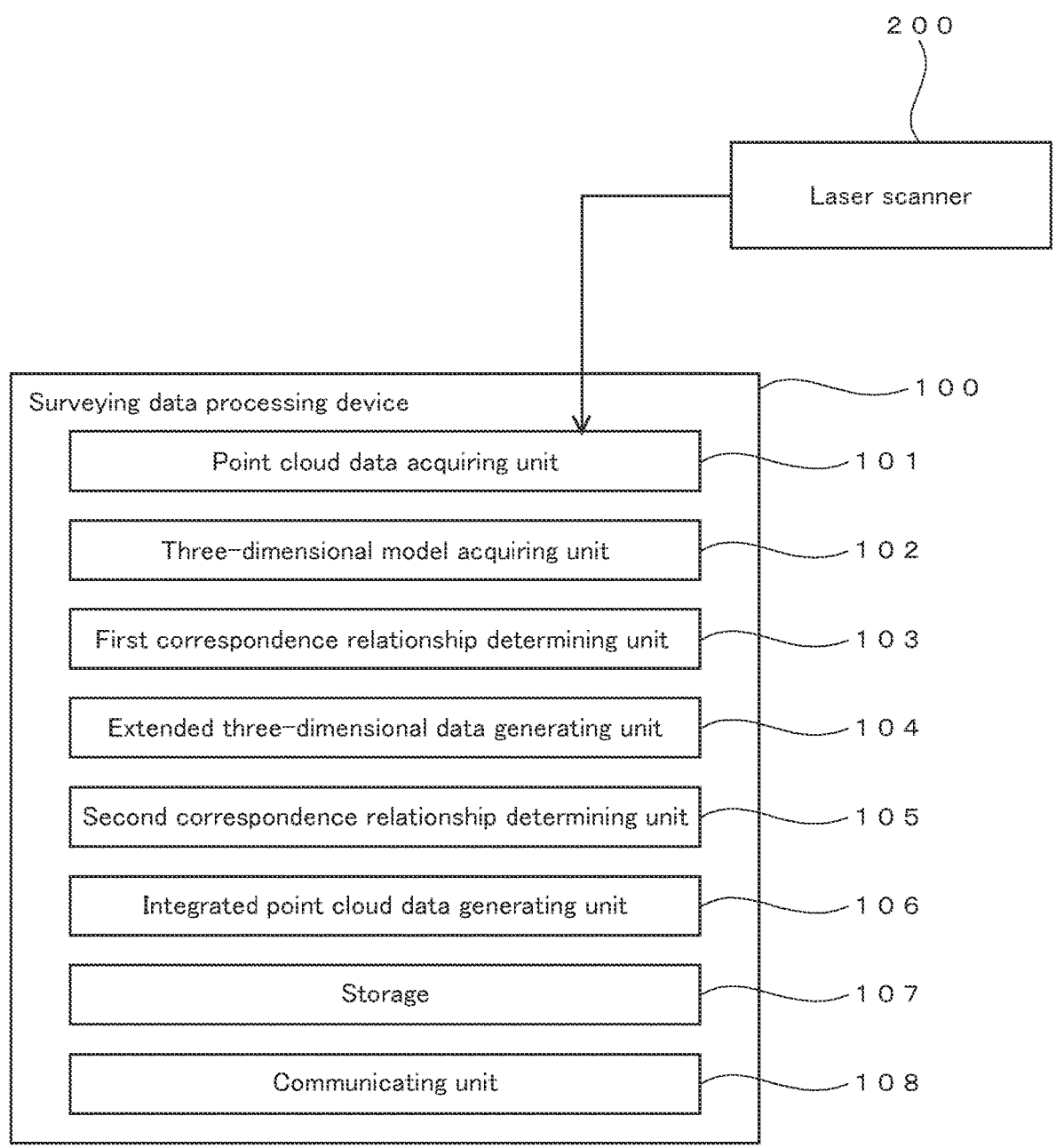
FIG. 5 is a block diagram of an embodiment.

FIG. 5 shows a block diagram of this embodiment. FIG. 5 shows a laser scanner 200 and a surveying data processing device 100. The laser scanner 200 uses a commercially available one. Techniques relating to the laser scanner are disclosed in Japanese Unexamined Patent Applications Laid-Open Nos. 2010-151682 and 2008-268004, U.S. Pat. Nos. 8,767,190 and 7,969,558, US Patent Application Publication No. 2017/0269197, etc. A laser scanner that electronically scans, as disclosed in US Patent Application Publication No. 2015/0293224, can also be employed as the laser scanner.

The surveying data processing device 100 is constituted by using a commercially available personal computer (PC). Although an example of preparing the surveying data processing device 100 separately from the laser scanner 200 is described herein, the surveying data processing device 100 may be combined with the laser scanner 200.

The surveying data processing device 100 includes a point cloud data acquiring unit 101, a three-dimensional model acquiring unit 102, a first correspondence relationship determining unit 103, an extended three-dimensional data generating unit 104, a second correspondence relationship determining unit 105, an integrated point cloud data generating unit 106, a storage 107, and a communicating unit 108.

The function of each of the functional units of the surveying data processing device 100 is implemented in such a manner that application software for implementing each of the functional units shown in FIG. 5 is installed in a PC to be used, and that a program constituting the application software is executed by a CPU of the PC. One or more or all of each of the functional units may be composed of each type of processor or electronic circuit. Alternatively or additionally, at least one of the functional units may be implemented by using an arithmetic operation section of an external personal computer (PC) or of a server.

The point cloud data acquiring unit 101 acquires point cloud data that is obtained by the laser scanner 200 in laser scanning. In the laser scanning, laser scanning light is emitted spottily on an object to be measured, at an interval of several kHz to several tens of kHz, while the direction of the laser scanning light is varied, and a three-dimensional location of each point is obtained based on a principle of laser distance measurement. An aggregation of data of the three-dimensional locations of the points is used as point cloud data that is obtained by laser scanning.

At this stage, in the condition in which the absolute location of the set-up location or of the instrument point of the laser scanner 200 is known, the obtained point cloud data is described in the absolute coordinate system. In a case in which the absolute location of the set-up location or of the instrument point of the laser scanner 200 is unknown, the obtained point cloud data is described in a local coordinate system that has an origin at the instrument point.

For example, the laser scanner 200 is set up at the first instrument point in FIG. 1, and laser scanning is performed. This provides first point cloud data in FIG. 2A. Then, the laser scanner 200 is set up at the second instrument point in FIG. 1, and laser scanning is performed. This provides second point cloud data in FIG. 2B. These first and second point cloud data are acquired by the point cloud data acquiring unit 101.

Hereinafter, it is assumed that first point cloud data is point cloud data obtained by a laser scanner set up at the first instrument point, for example, in FIGS. 1 and 2A, and it is also assumed that second point cloud data is point cloud data obtained by the laser scanner set up at the second instrument point.

The three-dimensional model acquiring unit 102 acquires data of a three-dimensional model of an object that is to be measured by laser scanning. An example of the three-dimensional model includes a three-dimensional model acquired from design data, e.g., CAD data, of an object to be measured. For example, in a case of targeting a room, data of a three-dimensional model of the room is acquired from design data relating to the room, by the three-dimensional model acquiring unit 102.

The first correspondence relationship determining unit 103 determines a correspondence relationship between the first point cloud data and the three-dimensional model acquired by the three-dimensional model acquiring unit 102. The first point cloud data is one of the two sets of point cloud data that are to be integrated by means of obtaining a correspondence relationship therebetween.

The following describes a technique for determining a correspondence relationship to be used herein. A first method involves searching for a condition in which a statistical value of a separated distance "di" satisfies a specific condition. The separated distance "di" is a distance between each point of the first point cloud data and a plane that is specified by the three-dimensional model, which is acquired by the three-dimensional model acquiring unit 102. The specific condition is a condition in which the statistical value is minimal. Examples of specific conditions in which the statistical value of the separated distance "di" satisfies, include a condition in which an integrated value Σdi of the separated distances "di" is minimal and a condition in which an average of the separated distances "di" is minimal.

In a second method, first, a three-dimensional model is generated from the first point cloud data. This three-dimensional model is represented as a first three-dimensional model. The technique for generating a three-dimensional model from point cloud data is disclosed in, for example, WO 2011/070927 and Japanese Unexamined Patent Applications Laid-Open Nos. 2012-230594 and 2014-35702.

After the first three-dimensional model is obtained, a correspondence relationship between the first three-dimensional model and the three-dimensional model acquired by the three-dimensional model acquiring unit 102, for example, a design drawing-based three-dimensional model. Techniques for determining a correspondence relationship between three-dimensional models are disclosed in, for example, WO 2012/141235 and Japanese Unexamined Patent Applications Laid-Open Nos. 2014-35702, 2015-46128, and 2017-15598.

As a result of determination of the correspondence relationship between the first three-dimensional model and the three-dimensional model acquired by the three-dimensional model acquiring unit 102, a correspondence relationship between the first point cloud data as the base of the first three-dimensional model and the three-dimensional model acquired by the three-dimensional model acquiring unit 102, is determined.

A third method involves generating point cloud data that coincides with the three-dimensional model acquired by the three-dimensional model acquiring unit 102, as artificial point cloud data, and also involves determining a correspondence relationship between this artificial point cloud data and the first point cloud data. Matching between sets of point cloud data is performed by using, for example, template matching. The matching between sets of point cloud data can use techniques as disclosed in, for example, Japanese Unexamined Patent Applications Laid-Open Nos. 2013-186816 and 2013-178656.

The determination of the correspondence relationship between the artificial point cloud data and the first point cloud data also determines a correspondence relationship between the first point cloud data and the three-dimensional model as the base of the artificial point cloud data, which is the three-dimensional model acquired by the three-dimensional model acquiring unit 102.

On the basis of the correspondence relationship, determined by the first correspondence relationship determining unit 103, between the first point cloud data and the three-dimensional model acquired by the three-dimensional model acquiring unit 102, the extended three-dimensional data generating unit 104 merges the first point cloud data with the three-dimensional model acquired by the three-dimensional model acquiring unit 102 and generates extended three-dimensional data in which the three-dimensional information of the first point cloud data is extended.

There are some methods to obtain the extended three-dimensional data. A first method uses three-dimensional data in which point cloud data is merged with a three-dimensional model that is expressed by data of planes and lines, as the extended three-dimensional data. In this case, for example, the first point cloud data and the three-dimensional data acquired by the three-dimensional model acquiring unit 102, e.g., three-dimensional CAD data obtained from design data, are merged with each other by matching the scale and the locations.

A second method provides extended three-dimensional data by converting the first point cloud data into a three-dimensional model and merging this three-dimensional model with the three-dimensional data acquired by the three-dimensional model acquiring unit 102. This merger is performed based on the correspondence relationship, determined by the first correspondence relationship determining unit 103, between the first point cloud data and the three-dimensional model acquired by the three-dimensional model acquiring unit 102. The second method provides extended three-dimensional data expressed by a three-dimensional model. The data that is expressed by a three-dimensional model is data of three-dimensional information expressed by planes and lines. A typical example of three-dimensional information expressed by a three-dimensional model includes three-dimensional CAD data.

A third method involves generating artificial point cloud data from the three-dimensional data acquired by the three-dimensional model acquiring unit 102 and merging this artificial point cloud data with the first point cloud data. This merger is also performed based on the correspondence relationship, determined by the first correspondence relationship determining unit 103, between the first point cloud data and the three-dimensional model acquired by the three-dimensional model acquiring unit 102. The third method provides extended three-dimensional data expressed by point cloud data.

The second correspondence relationship determining unit 105 determines a correspondence relationship between the second point cloud data and the extended three-dimensional data generated by the extended three-dimensional data generating unit 104. The second point cloud data is the other of the two sets of point cloud data that are to be integrated by means of obtaining a correspondence relationship therebetween. The technique relating to the determination of the correspondence relationship is the same as that used by the first correspondence relationship determining unit 103.

The integrated point cloud data generating unit 106 acquires integrated point cloud data in which the first and the second point cloud data are integrated on the basis of the correspondence relationship, determined by the second correspondence relationship determining unit 105, between the extended three-dimensional data and the second point cloud data.

In the integrated point cloud data, the first and the second point cloud data are described in the same coordinate system. Examples of the coordinate system that is used include the absolute coordinate system, a coordinate system having an origin at the first instrument point, a coordinate system having an origin at the second instrument point, and a coordinate system having an origin at a freely selected location.

For example, it is assumed that an "i"-th point "i" of the first point cloud data has a location $(X_{1i}, Y_{1i}, Z_{1i})$ in a local coordinate system centered at the first instrument point and that a "j"-th point "j" of the second point cloud data has a local $(X_{2j}, Y_{2j}, Z_{2j})$ in a local coordinate system centered at the second instrument point. In addition, the points "i" and "j" exist in a range covered by both of the first and the second point cloud data.

In this situation, a correspondence relationship between the first and the second point cloud data is obtained. In the condition in which this correspondence relationship is clear, it is determined to which point of the second point cloud data the point "i" of the first point cloud data corresponds. Naturally, it is also determined to which point of the first point cloud data the point "j" of the second point cloud data corresponds. The determination of the correspondence relationship between the common parts also reveals a location relationship between parts that are not commonly contained, that is, between second point cloud data hidden due to occlusion or out of the range of emission, from the first instrument point, and first point cloud data hidden due to occlusion or out of the range of emission, from the second instrument point.

As a result, coordinates of points of the second point cloud data can be described in the coordinate system that describes the first point cloud data. Conversely, coordinates of points of the first point cloud data can be described in the coordinate system that describes the second point cloud data. Moreover, in the condition in which exterior orientation parameters (location and attitude) in the absolute coordinate system of the laser scanner at each of the first and the second instrument points are known, the first and the second point cloud data can be described in the absolute coordinate system. Thus, integrated point cloud data in which the first and the second point cloud data are integrated is obtained by describing them in one coordinate system.

The storage 107 stores various pieces of information relating to processes and also stores a program necessary for operation. The communicating unit 108 communicates with an external device. Examples of the manner of the communication include communication using a wired line, communication using wireless, and communication using an optical line. In one example, communication using each type of wireless communication standard, a telephone line, or an internet line is made via the communicating unit 108.

Example of Processing

Figure 6:
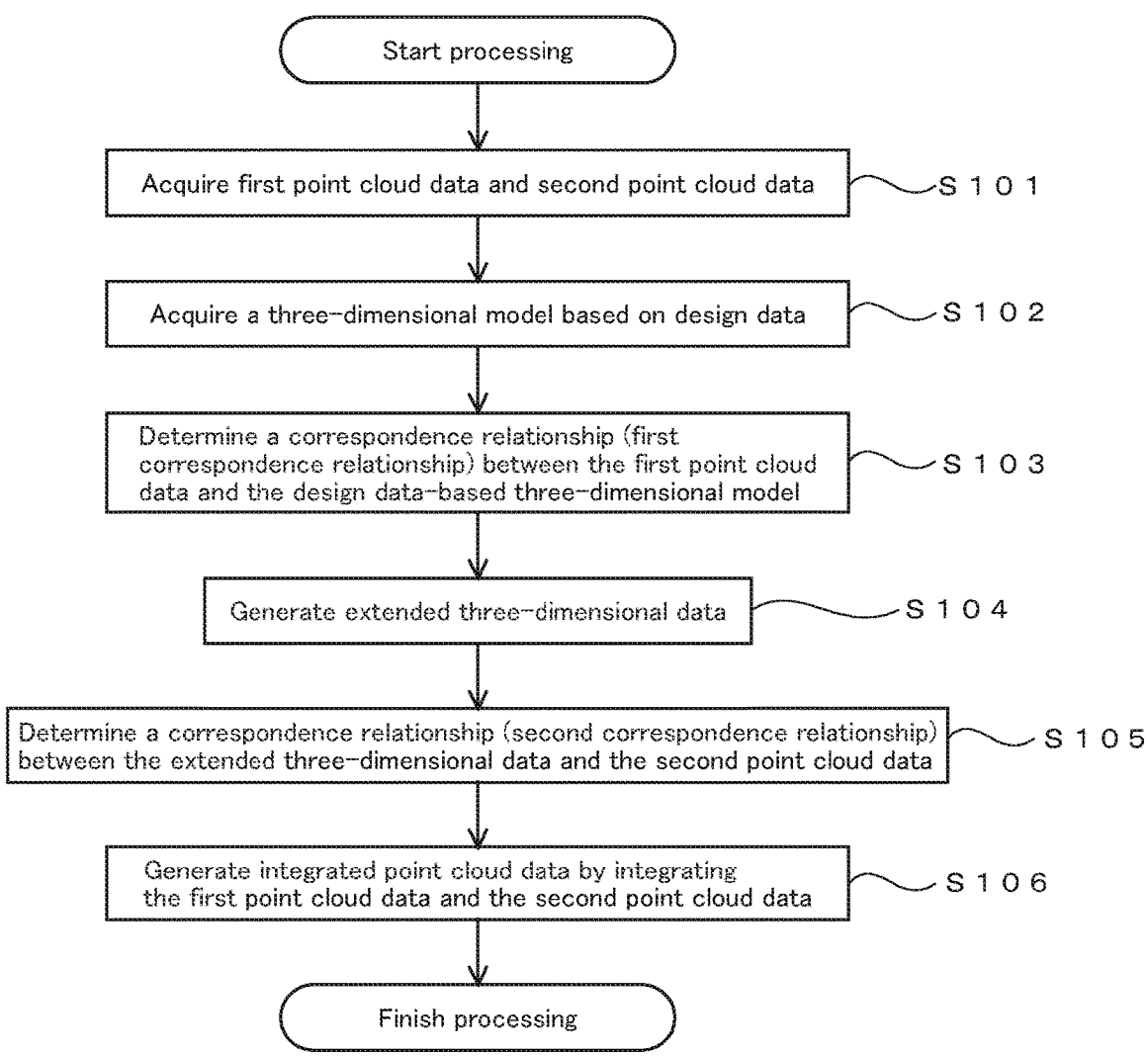
FIG. 6 is a flowchart showing an example of a processing procedure.

FIG. 6 is a flowchart showing an example of processing performed by the surveying data processing device 100. The program for executing the processing in FIG. 6 is stored in the storage 107 or in an appropriate storage medium, read therefrom, and is executed by the CPU of the PC constituting the surveying data processing device 100. It is also possible to store this program in a server and download it therefrom via the internet.

Herein, an example of performing processing in the situation illustrated in FIGS. 1, 2A, and 2B will be described. After the processing starts, first, first point cloud data and second point cloud data are acquired (step S101). This process is performed by the point cloud data acquiring unit 101.

Next, a three-dimensional model of the room to be measured is acquired from design CAD data of the room (step S102). This process is performed by the three-dimensional model acquiring unit 102.

Then, a correspondence relationship between the first point cloud data and the design data-based three-dimensional model is determined as a first correspondence relationship (step S103). This process is performed by the first correspondence relationship determining unit 103.

Thereafter, the first point cloud data is extended by using three-dimensional information of the design data to obtain extended three-dimensional data (step S104). This process is performed by the extended three-dimensional data generating unit 104.

After the extended three-dimensional data is obtained, a correspondence relationship between the extended three-dimensional data and the second point cloud data is determined as a second correspondence relationship (step S105). This process is performed by the second correspondence relationship determining unit 105.

Next, on the basis of the correspondence relationship obtained in step S105, integrated point cloud data is generated by integrating the first and the second point cloud data (step S106). This process is performed by the integrated point cloud data generating unit 106.

2. Second Embodiment

The three-dimensional model to be compared with the first point cloud data may be a three-dimensional model of a part of an object to be measured, instead of a three-dimensional model of the entire object to be measured.

3. Third Embodiment

It is possible to determine a correspondence relationship between the first point cloud data and the design data-based three-dimensional model, in a two-dimensional plane. In this case, a correspondence relationship between a sectional plane of the first point cloud data and a sectional plane of the three-dimensional model is determined. Examples of the sectional plane include a horizontal section cut along a horizontal plane and a vertical section cut along a vertical plane.

In this case, point cloud data contained in, or in proximity to, a target plane is compared with a shape of a sectional plane of the three-dimensional model, whereby a correspondence relationship therebetween is determined. The condition shown in FIG. 4A can also be understood to be an example of this case.

After the two-dimensional correspondence relationship is determined, it is also possible to determine a three-dimensional correspondence relationship by using the two-dimensional correspondence relationship as an initial condition. This method determines the correspondence relationship step by step, thereby enabling highly efficient and highly accurate processing.

In a similar manner, it is also possible to determine a correspondence relationship between the extended three-dimensional data and the second point cloud data, in a two-dimensional plane. For example, a correspondence relationship between the extended three-dimensional data and the second point cloud data can be determined with respect to a horizontal section or to a vertical section.

Also in this case, after the two-dimensional correspondence relationship is determined, it is possible to determine a three-dimensional correspondence relationship by using the two-dimensional correspondence relationship as an initial condition.

4. Fourth Embodiment

The correspondence relationship between the first point cloud data and the three-dimensional model may be determined by using one or both of a shape and a dimension of the three-dimensional model to be compared with the first point cloud data.

In one example, it is assumed that an object to be measured contains a pillar with a 30 cm-diameter circular section (horizontal section) that is cut along a horizontal plane. In this case, it is examined whether a part of the 30 cm-diameter circle is contained in a horizontal section of the first point cloud data, or more precisely, whether the first point cloud data is contained in, or in proximity to, the horizontal section. In a case in which a part of the 30 cm-diameter circle is contained in the first point cloud data, a model of a sectional plane of the circular pillar, and the first point cloud data, are merged in the corresponding sectional plane, whereby extended data of the first point cloud data is obtained.

The above processes are performed in response to a user specifying the target column in a UI screen and inputting or specifying information for identifying the target column. In one example, a shape or a dimension of the target column is input by a user. Although a case of using two-dimensional information of a three-dimensional model that is used, is described above, it is also possible to perform similar processes by using three-dimensional information of the three-dimensional model.

What is claimed is:

1. A surveying data processing device comprising a processor or circuitry, the processor or circuitry configured to:
    acquire first point cloud data and second point cloud data, the first point cloud data being obtained by performing laser scanning, from a first viewpoint, on an object to be measured, the second point cloud data being obtained by performing laser scanning, from a second viewpoint, on the object to be measured;
    acquire data of a three-dimensional model of the object to be measured, this data being prepared in advance;
    obtain a correspondence relationship between the first point cloud data and at least a part of the three-dimensional model;
    integrate information of the at least a part of the three-dimensional model with the first point cloud data to generate extended data in which the first point cloud data is extended, on a basis of the correspondence relationship between the first point cloud data and the at least a part of the three-dimensional model; and
    determine a correspondence relationship between the extended data and the second point cloud data, the correspondence relationship between the first point cloud data and at least a part of the three-dimensional model being obtained by determining a correspondence relationship between a horizontal section that is cut along a horizontal plane of the first point cloud data and a horizontal section that is cut along a horizontal plane of the three-dimensional model.

2. The surveying data processing device according to claim 1, wherein the three-dimensional model is acquired from design data of the object to be measured.

3. The surveying data processing device according to claim 1, wherein the three-dimensional model contains an occluded part of the object to be measured that is hidden and is thus not viewable from the first viewpoint but is viewable from the second viewpoint.

4. The surveying data processing device according to claim 3, wherein the determination of the correspondence relationship between the extended data and the second point cloud data includes determining a correspondence relationship between the occluded part and the second point cloud data.

5. The surveying data processing device according to claim 1, wherein the three-dimensional model contains a specific part of the object to be measured that is out of a range of emission of the laser scanning at the first viewpoint, but is in a range of emission of the laser scanning at the second viewpoint.

6. The surveying data processing device according to claim 5, wherein the determination of the correspondence relationship between the extended data and the second point cloud data includes determination of a correspondence relationship between the specific part and the second point cloud data.

7. The surveying data processing device according to claim 1, wherein, in determining the correspondence relationship between the first point cloud data and the three-dimensional model, a condition in which a statistical value of a separated distance between a point constituting the first point cloud data and a plane constituting the three-dimensional model satisfies a specific condition, is searched for.

8. A surveying data processing method comprising:
    acquiring first point cloud data and second point cloud data, the first point cloud data being obtained by performing laser scanning, from a first viewpoint, on an object to be measured, the second point cloud data being obtained by performing laser scanning, from a second viewpoint, on the object to be measured;
    acquiring data of a three-dimensional model of the object to be measured, this data being prepared in advance;

obtaining a correspondence relationship between the first point cloud data and at least a part of the three-dimensional model;

integrating information of the at least a part of the three-dimensional model with the first point cloud data to generate extended data in which the first point cloud data is extended, on a basis of the correspondence relationship between the first point cloud data and the at least a part of the three-dimensional model; and determining a correspondence relationship between the extended data and the second point cloud data, the correspondence relationship between the first point cloud data and at least a part of the three-dimensional model being obtained by determining a correspondence relationship between a horizontal section that is cut along a horizontal plane of the first point cloud data and a horizontal section that is cut along a horizontal plane of the three-dimensional model.

9. A non-transitory computer recording medium storing computer executable instructions that, when executed by a computer processor, cause the computer processor to:

acquire first point cloud data and second point cloud data, the first point cloud data being obtained by performing laser scanning, at a first viewpoint, on an object to be measured, the second point cloud data being obtained by performing laser scanning, from a second viewpoint, on the object to be measured;

acquire data of a three-dimensional model of the object to be measured, this data being prepared in advance;

obtain a correspondence relationship between the first point cloud data and at least a part of the three-dimensional model;

integrate information of the at least a part of the three-dimensional model with the first point cloud data to generate extended data in which the first point cloud data is extended, on a basis of the correspondence relationship between the first point cloud data and the at least a part of the three-dimensional model; and determine a correspondence relationship between the extended data and the second point cloud data, the correspondence relationship between the first point cloud data and at least a part of the three-dimensional model being obtained by determining a correspondence relationship between a horizontal section that is cut along a horizontal plane of the first point cloud data and a horizontal section that is cut along a horizontal plane of the three-dimensional model.

\* \* \* \* \*